(12) United States Patent
Segev et al.

(10) Patent No.: US 12,461,583 B2
(45) Date of Patent: Nov. 4, 2025

(54) PHY LANES DISABLING FOR POWER EFFICIENCY

(71) Applicant: Sandisk Technologies, Inc., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 55 days.

(21) Appl. No.: 18/455,958

(22) Filed: Aug. 25, 2023

(65) Prior Publication Data
US 2025/0068226 A1    Feb. 27, 2025

(51) Int. Cl.
*G06F 1/3234* (2019.01)
*G06F 13/40* (2006.01)

(52) U.S. Cl.
CPC ........ *G06F 1/3253* (2013.01); *G06F 13/4068* (2013.01)

(58) Field of Classification Search
CPC .............. G06F 13/4068; G06F 1/3253; G06F 2213/0026
USPC ......................................................... 713/323
See application file for complete search history.

(56) References Cited

U.S. PATENT DOCUMENTS

| | | | |
|---|---|---|---|
| 9,223,735 B2 | 12/2015 | Harriman et al. | |
| 9,378,181 B2 * | 6/2016 | Krig | G06F 9/30036 |
| 10,181,975 B2 * | 1/2019 | Chellappan | H04L 69/324 |
| 10,223,323 B2 * | 3/2019 | Nikami | G06F 13/4282 |
| 10,331,605 B2 * | 6/2019 | Garibay | G06F 13/4022 |
| 10,503,239 B2 * | 12/2019 | Bito | H04L 12/12 |
| 11,474,960 B2 * | 10/2022 | Das Sharma | G06F 13/1678 |
| 2009/0006708 A1 | 1/2009 | Lim | |
| 2011/0173352 A1 * | 7/2011 | Sela | G06F 1/3253 710/16 |
| 2016/0216758 A1 * | 7/2016 | Kachare | G06F 3/0634 |
| 2017/0091138 A1 * | 3/2017 | Wang | G06F 13/4282 |
| 2020/0278733 A1 | 9/2020 | Li et al. | |
| 2021/0041929 A1 | 2/2021 | Connor et al. | |
| 2022/0327073 A1 | 10/2022 | Jeon | |
| 2024/0111354 A1 * | 4/2024 | Srivastava | G06F 1/3287 |

OTHER PUBLICATIONS

Jeff Morris et. al., PHY Interface For the PCI Express, SATA, USB 3.1, DisplayPort, and USB4 Architectures.

* cited by examiner

*Primary Examiner* — Brian T Misiura
(74) *Attorney, Agent, or Firm* — Patterson + Sheridan, LLP

(57) ABSTRACT

Instead of entering lanes into an unused power state, enter unactive lanes into an unconnected power state to save more current during low power states. Using a small control logic will allow a controller to control unactive lanes in low power mode. When a lane is in an unactive power state or in an unused power state, an unactive lane controller (ULC) uses side-band signaling to place the unactive lane into either unused power state or unconnected power state. When a lane is in unused power state, then the ULC places the lane in unconnected power state. A single ULC is able to controller multiple lanes or you can have multiple ULC's, each controlling a single lane.

20 Claims, 9 Drawing Sheets

PHY LANES DISABLING FOR POWER EFFICIENCY

BACKGROUND OF THE DISCLOSURE

Field of the Disclosure

Embodiments of the present disclosure generally relate to improving power state change operations in lanes.

Description of the Related Art

Nonvolatile memory (NVM) express (NVMe) solid state drives (SSD) over a peripheral component interconnect express (PCIe) might hold multiple lanes. For example, a GEN5x4 stands for PCIe GEN5, using 4 Lanes. Each lane works at a very high speed and contains a lot of analog and digital logic. The PHY is connected (inside the SSD controller) to a media access layer (MAC).

When a host is connected to a SSD, there are lanes that connect the host to the SDD. There are many ways in which the lanes operate between the host and the SDD. The host can have all lanes connected to the SDD and have all the lanes in use. The host can have less than all the lanes available which will leave some of the lanes unconnected. Also, there may be the case where all the lanes are connected, but some of the lanes are unused.

A lane in a low power state will have many levels of exit latency and power saving levels. When a lane is in an unconnected power state in a low power state, then the exit latency will be considered medium with a high power saving level. When a lane is in unused power state in a low power state, the exit latency will be low while the power saving level will be considered medium. When a lane is active, there is neither exit latency nor power saving.

When in a non-active mode, there is little evidence of having a lower exit latency or higher power saving level more efficient than either a lane being in unconnected power state or in an unused power state. Not being able to change the power state of a lane leads to performance degradation and increased latency.

Therefore, there is a need in the art for changing the power state of lanes.

SUMMARY OF THE DISCLOSURE

Instead of entering lanes into an unused power state, enter unactive lanes into an unconnected power state to save more current during low power states. Using a small control logic will allow a controller to control unactive lanes in low power mode. When a lane is in an unactive power state or in an unused power state, an unactive lane controller (ULC) uses side-band signaling to place the unactive lane into either unused power state or unconnected power state. When a lane is in unused power state, then the ULC places the lane in unconnected power state. A single ULC is able to controller multiple lanes or you can have multiple ULC's, each controlling a single lane.

In one embodiment, a data storage device comprises: a memory device; and a controller coupled to the memory device, wherein the controller is configured to: determine that one or more lanes of a physical connection (PHY) is unused; change a state of the one or more lanes of the PHY to an unconnected state from an unused state; and change the state of the one or more lanes of the PHY back to the unused state.

In another embodiment, a data storage device comprises: a memory device; and a controller coupled to the memory device, wherein the controller includes: a physical connection for connecting a plurality of lanes to a host device; a MAC coupled to the PHY; and at least one unactive lanes controller (ULC) coupled between the PHY and the MAC, wherein the at least one ULC is configured to moved inactive lanes of the plurality of lanes into an unconnected state.

In another embodiment, a data storage device comprises: means to store data; and a controller coupled to the means to store data, wherein the controller is configured to: monitor power states of one or more lanes connecting a physical connection (PHY) to a host device; detect that one or more lanes is in an unused power state; and change a power state of the one or more lanes in the unused power state to an unconnected power state, wherein the controller is configured to performing the monitoring at a location between the PHY and a MAC.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of entering lanes into an unused power state, enter unactive lanes into an unconnected power state to save more current during low power states. Using a small control logic will allow a controller to control unactive lanes in low power mode. When a lane is in an unactive power state or in an unused power state, an unactive lane controller (ULC) uses side-band signaling to place the unactive lane into either unused power state or unconnected power state. When a lane is in unused power state, then the ULC places the lane in unconnected power state. A single ULC is able to controller multiple lanes or you can have multiple ULC's, each controlling a single lane.

Figure 1:
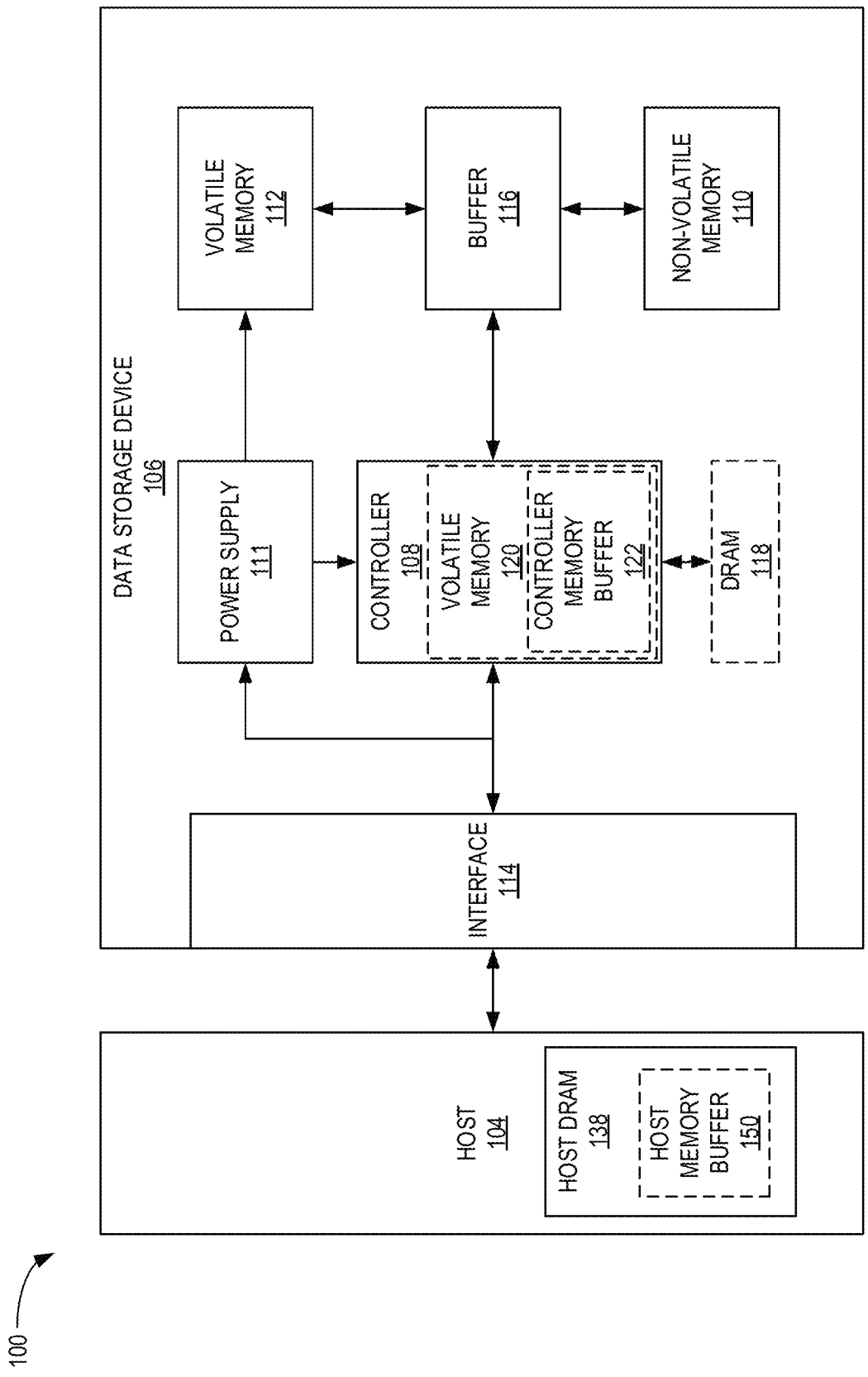
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
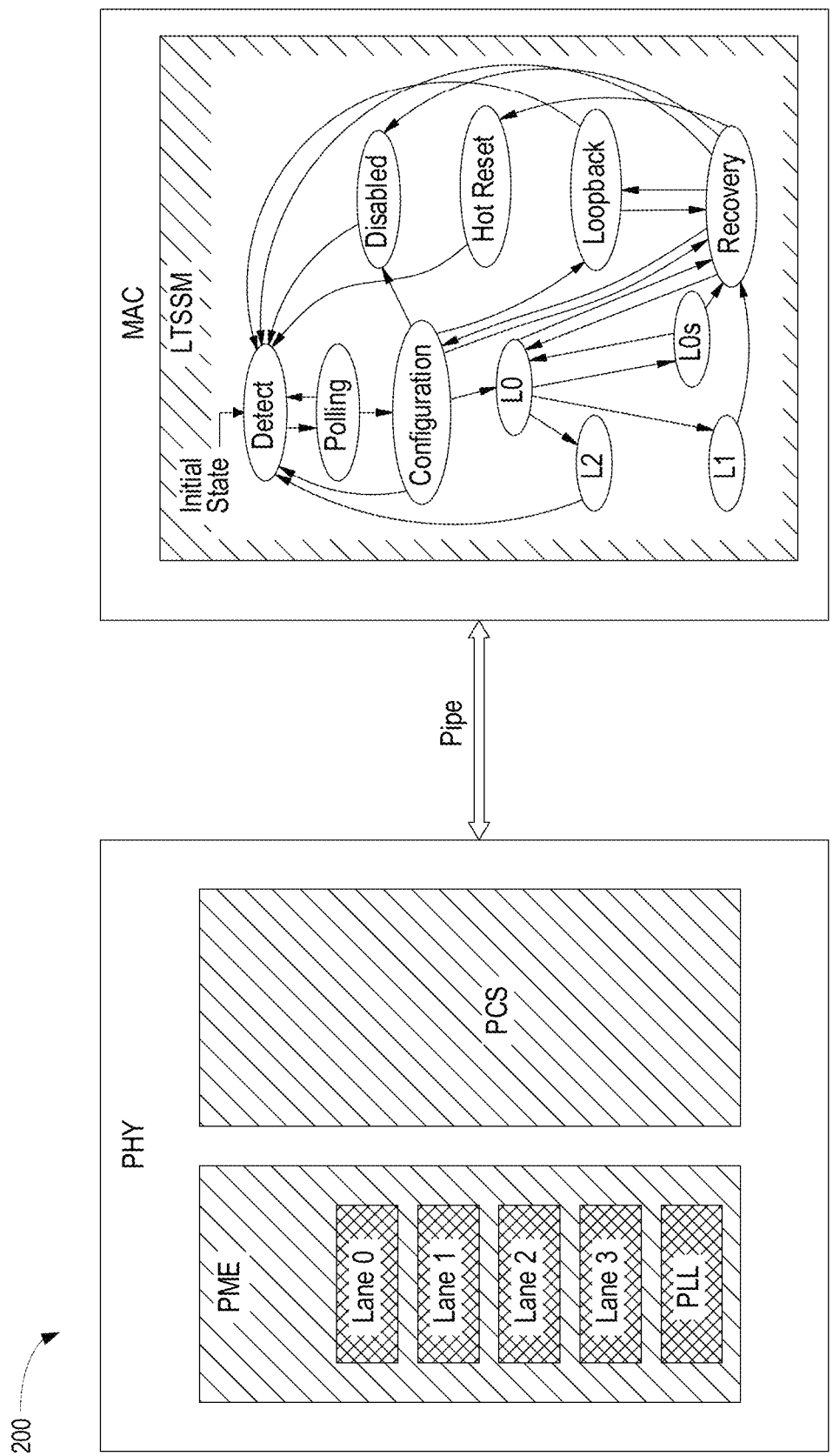
FIG. 2 is a schematic block diagram illustrating a PCIe-complex, according to one embodiment.

FIG. 2 is a schematic block diagram illustrating a PCIe-complex 200, according to one embodiment. The PHY consists of 4 lanes (Lane 0, Lane 1, Lane 2, and Lane 3), a phase-locked loop (PLL) to supply the high speed clock, and a process control solution (PCS) which is used as the digital control over the power management event (PME) (mostly analog parts). The MAC consists of but not limited to Link Training and Status State Machine (LTSSM). The MAC and PHY communicate via a standard PIPE interface.

Figure 3:
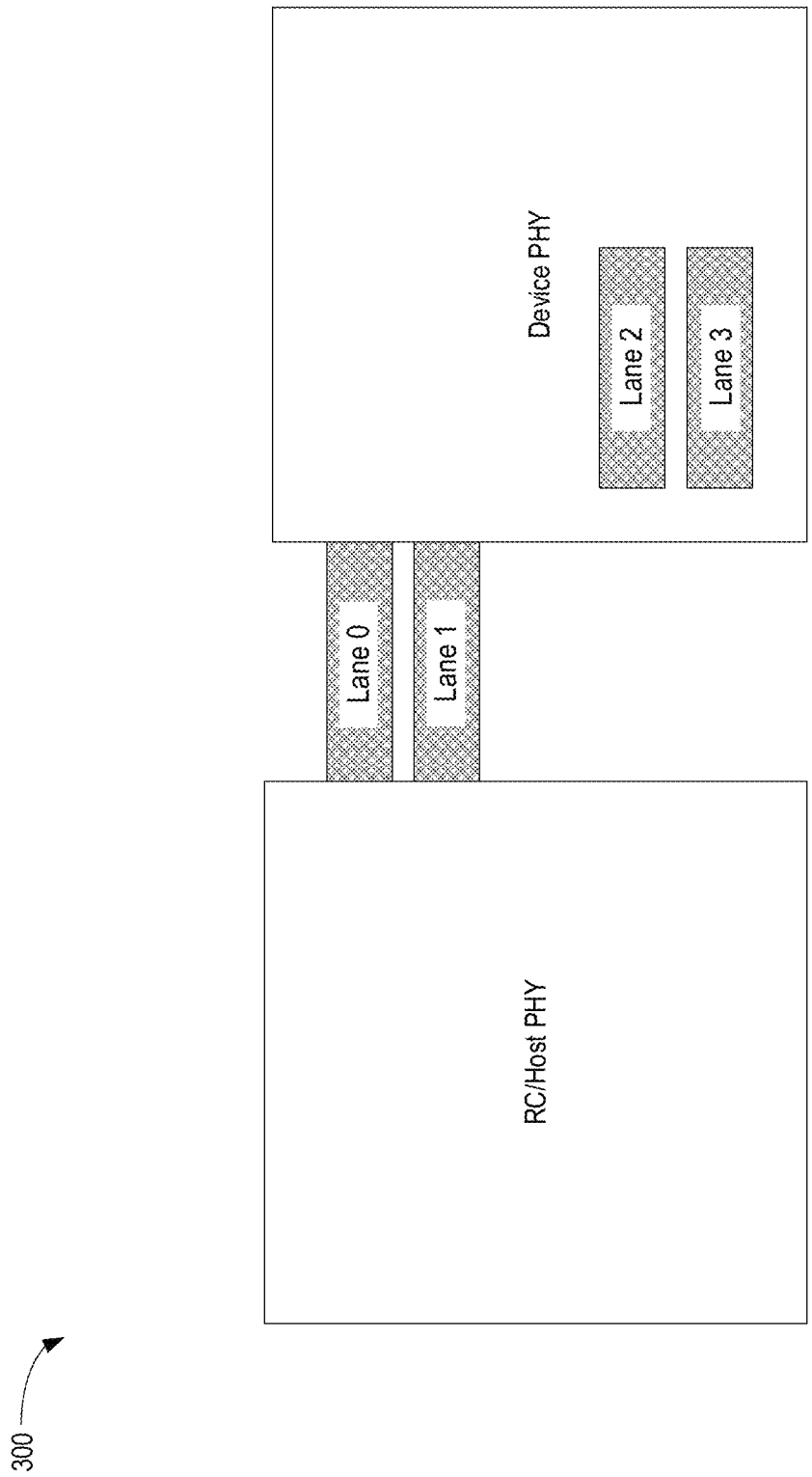
FIG. 3 is a schematic block diagram illustrating a PCIe-complex comprising unconnected lanes, according to certain embodiments.

FIG. 3 is a schematic block diagram illustrating a PCIe-complex 300 comprising unconnected lanes, according to certain embodiments. In this example, the RC/host PHY has only two lanes, so Lane 2 and Lane 3 are left unconnected. In this power state, Lane 2 and Lane 3 are left without power which is considered a disconnect power state. One reason for the lack of all lanes being used is the host does not require high bandwidth so the host will initiate using only two lanes, instead of 4.

Figure 4:
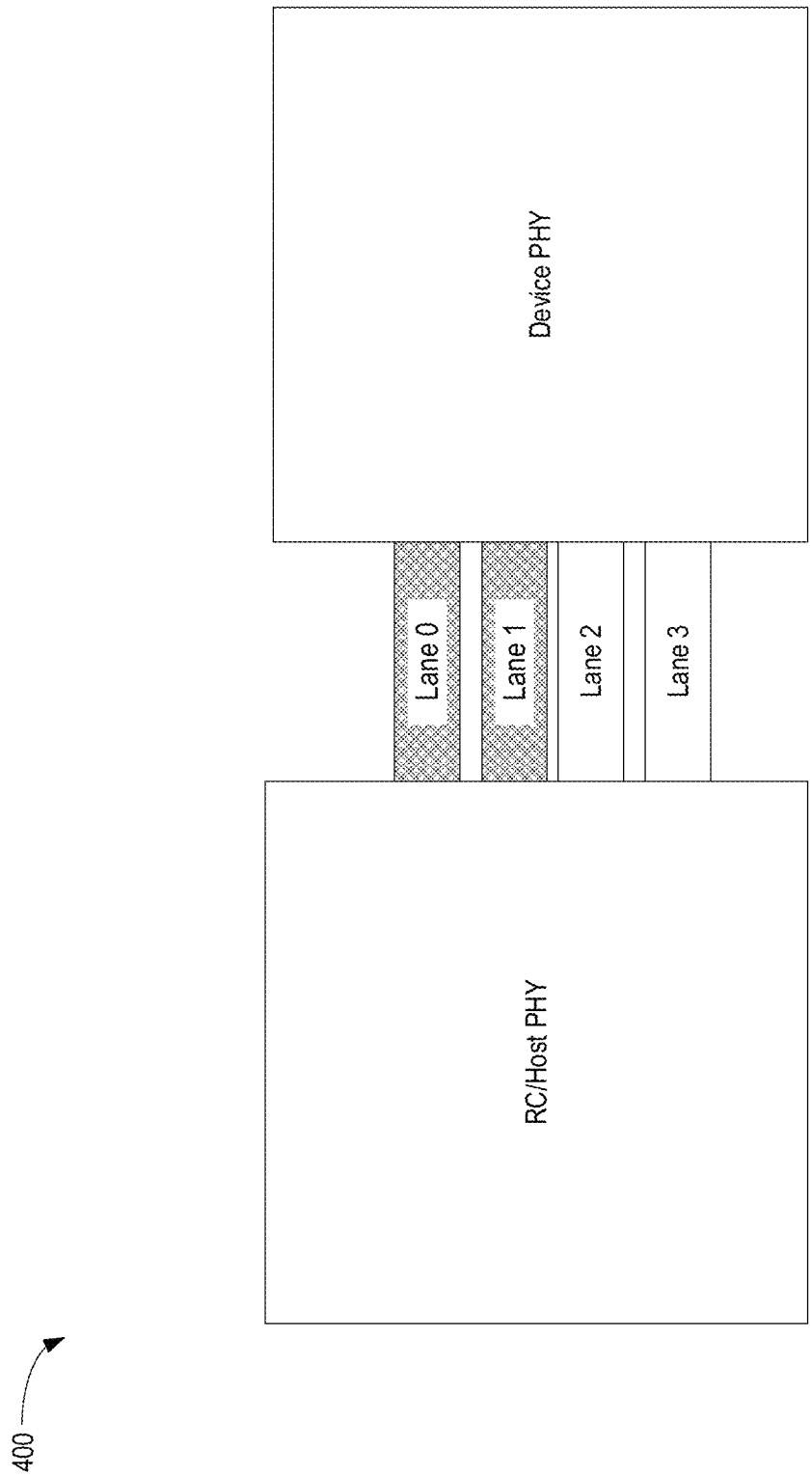
FIG. 4 is a schematic block diagram illustrating a PCIe-complex comprising unused lanes, according to certain embodiments.

FIG. 4 is a schematic block diagram illustrating a PCIe-complex 400 comprising unused lanes, according to certain embodiments. In this example, all four lanes (Lane 0, Lane 1, Lane 2, and Lane 3) are connected, but only Lane 0 and Lane 1 are being used. In an unused power state, some of the unused functionality is turned off to save power. During the training part of the LTSSM, the number of lanes to be used is determined by both the host and the device. The decision on the number of lanes to be used is done during the detect state of the LTSSM. When the LTSSM detects only two lanes are used, the device will use the PIPE interface to turn off the other two lanes by using the unused power state. However, the LTSSM cannot put the unused lanes in an unconnected power state.

The unused state requires less current, but more wake up time. For example, for an unconnected low power state, the exit latency is medium while the power savings is high. For an unused low power state, the exit latency is low while the power savings is medium. For an active low power state, the exit latency doesn't exist while there is no power savings. As will be discussed below, placing the non-active lanes into an unconnected state, rather than in an unused state, will save more current during lower power modes. A small control logic can control the non-active lanes in the low power state.

Figure 5A:
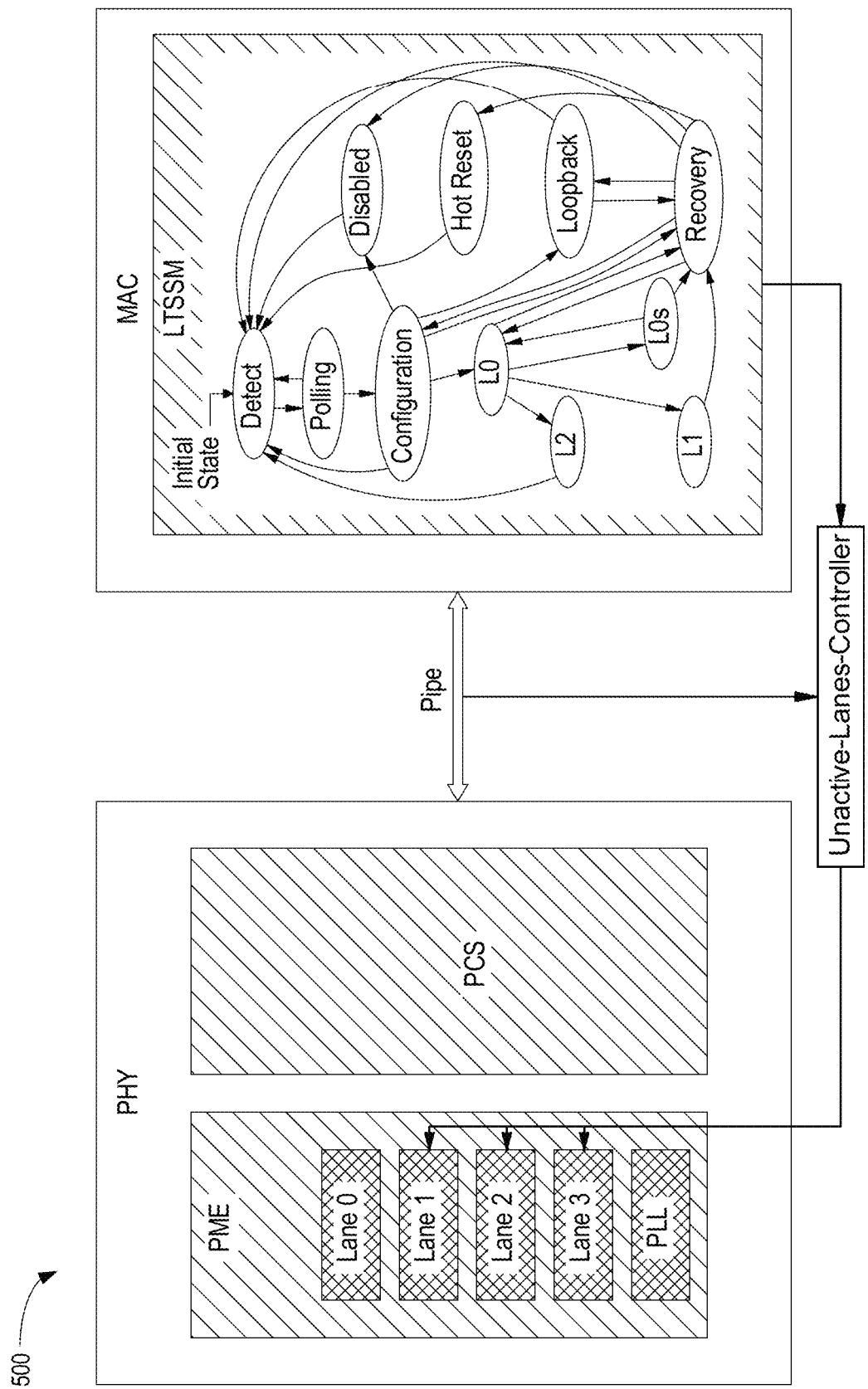
FIG. 5A is a schematic block diagram illustrating a PCIe-complex comprising a single unactive lane controller, according to certain embodiments.

FIG. 5A is a schematic block diagram illustrating a PCIe-complex 500 comprising a single unactive lane controller, according to certain embodiments. FIG. 5 shows an unactive lane controller (ULC) that controls Lane 1, Lane 2, and Lane 3. Lane 0 is not controlled by the ULC because Lane 0 must always be on. Each ULC looks at the LTSSM and the PIPE interface to make decisions and controls the PHY/PME using side-band signals.

The controls can put the unactive lanes into either unused power state or unconnected power state. Putting the lanes into unconnected power state is done via side-band signaling that does not exist on the PIPE interface. When the ULC decides that the low power state of the unactive lanes should be unused (and not in an unconnected power state), the ULC does not have to get involved, as this is controlled by the MAC via the PIPE interface.

Figure 5B:
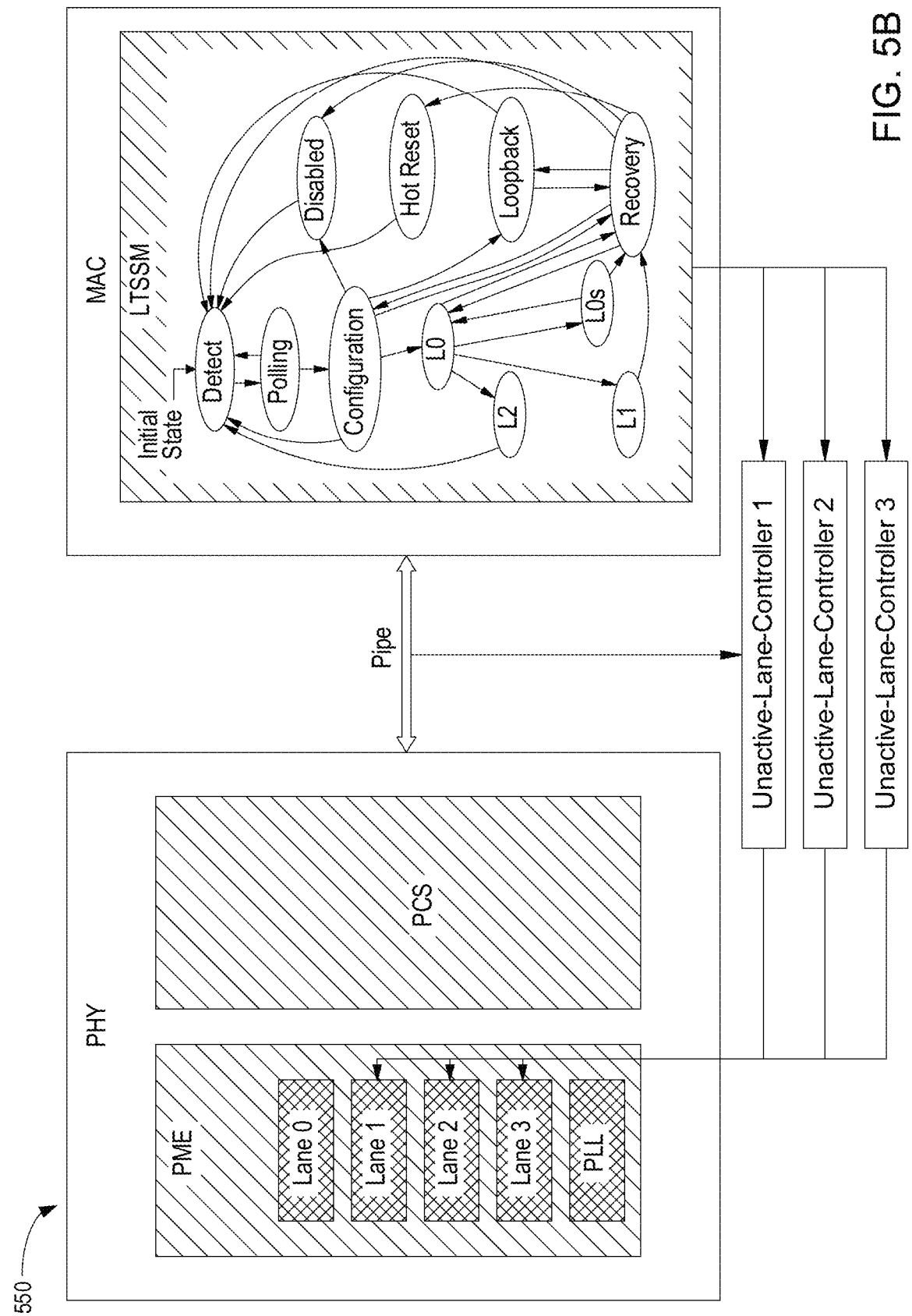
FIG. 5B is a schematic block diagram illustrating a PCIe-complex comprising multiple un-active lane controllers, according to certain embodiments.

FIG. 5B is a schematic block diagram illustrating a PCIe-complex 550 comprising multiple unactive lane controllers, according to certain embodiments. FIG. 5 shows a ULC1 that controls Lane 1, a ULC2 that controls Lane 2, and a ULC3 that controls Lane 3. Lane 0 is not controlled by any of the ULCs because Lane 0 must always be connected. The ULC looks at the LTSSM and the PIPE interface to make decisions and controls the PHY/PME using side-band signals.

The controls can put the unactive lanes into either unused power state or unconnected power state. Putting the lanes into unconnected power state is done via side-band signaling that does not exist on the PIPE interface. When any of the ULCs decide that the low power state of the unactive lanes should be unused (and not in an unconnected power state), then the ULCs do not have to get involved, as this is controlled by the MAC via the PIPE interface.

Figure 6:
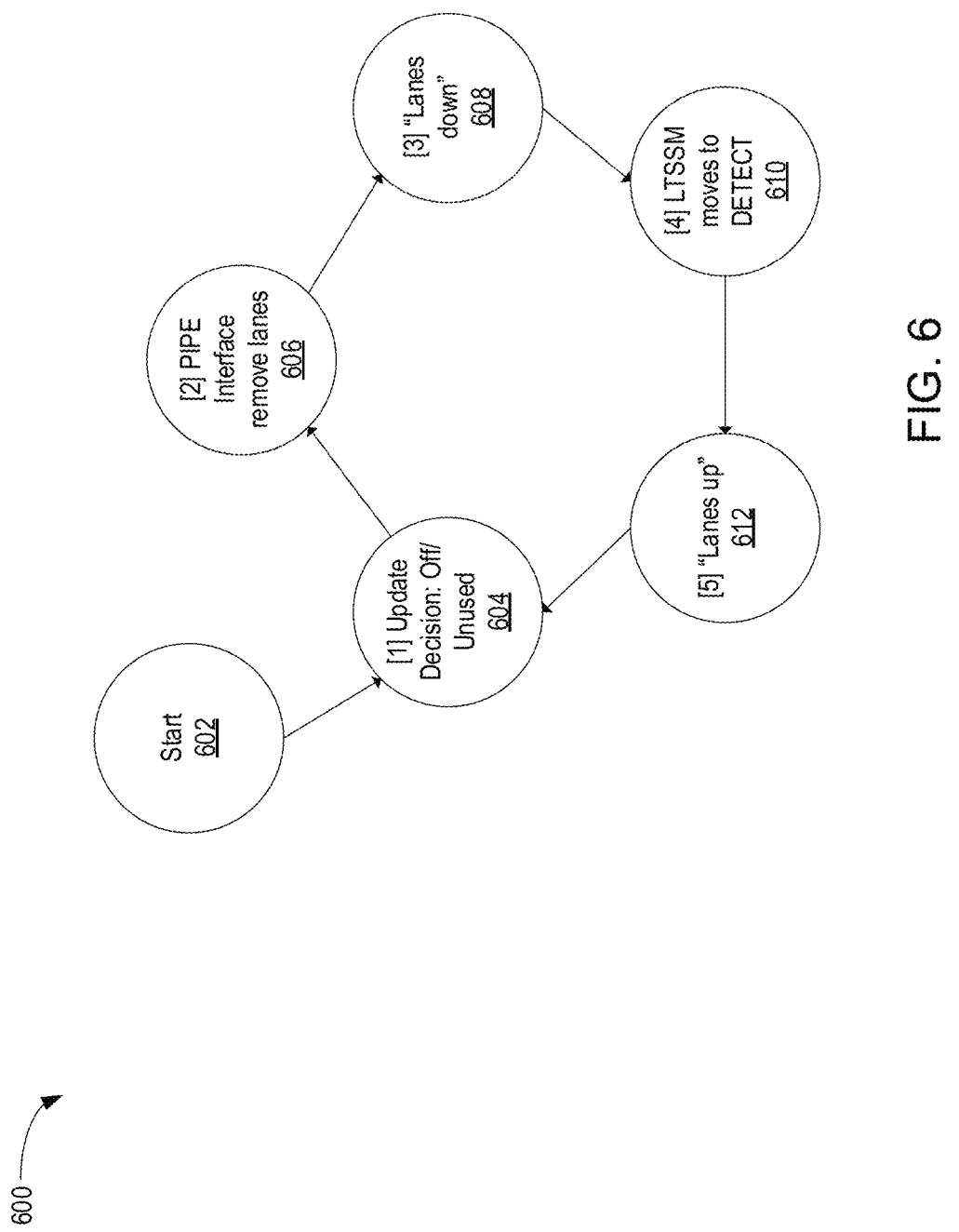
FIG. 6 is a flow chart illustrating a method for unused lanes controller, according to certain embodiments.

FIG. 6 is a flow chart illustrating a method 600 for unused lanes controller, according to certain embodiments. The method 600 begins at block 602. At block 604, the ULC begins with evaluating the preferred low power state of the unactive lanes. At block 606, the ULC monitors the PIPE interface to detect when any lane is pushed into a low-power state. At block 608, the state is now in low power state. If the preferred low power state for a lane is unconnected power state, then the ULC now uses the side band control signals to put the lane in a low power state. At block 610, the ULC waits for the LTSSM to move into a detect state. At block 612, the new state is now in an active state. If the preferred low power state for this lane is an unconnected power state, then the ULC now uses the sideband control signals to wake up the lane from the previous state, back to a MAC controlled state.

When separating a ULC per lane, the ULC is duplicated separately once per lane. This will allow, for example, a controller connected to two lanes to put Lane 2 and Lane 3 in unconnected power state, and Lane 1 might be in unused power state. Separating the ULC per lane also allows to support a multi-port PCIe (as used in ESS products), as each ULC can monitor a different LTSSM (Different link).

When utilizing static decision making, the ULC can be configured (per lane) to always work in an unconnected power state for power saving or always work in an unused power state for power saving. Static decision making is more suitable when the product use is known and determined if the power is much more critical than the exit latency or vice versa. However, the ULC might also work in dynamic mode, when the ULC can collect information, or have the information provided by some external decision making. This allows for sometimes using the unconnected power state, and other times using the unused power state for the unactive lanes. For example, a host that has 4 lanes, but switches from Lane 1 to Lane 2 and then back, will prefer power saving more than exit latency. If a host (when lanes are active) uses the lane's max bandwidth, the user might prefer better exit latency.

Figure 7:
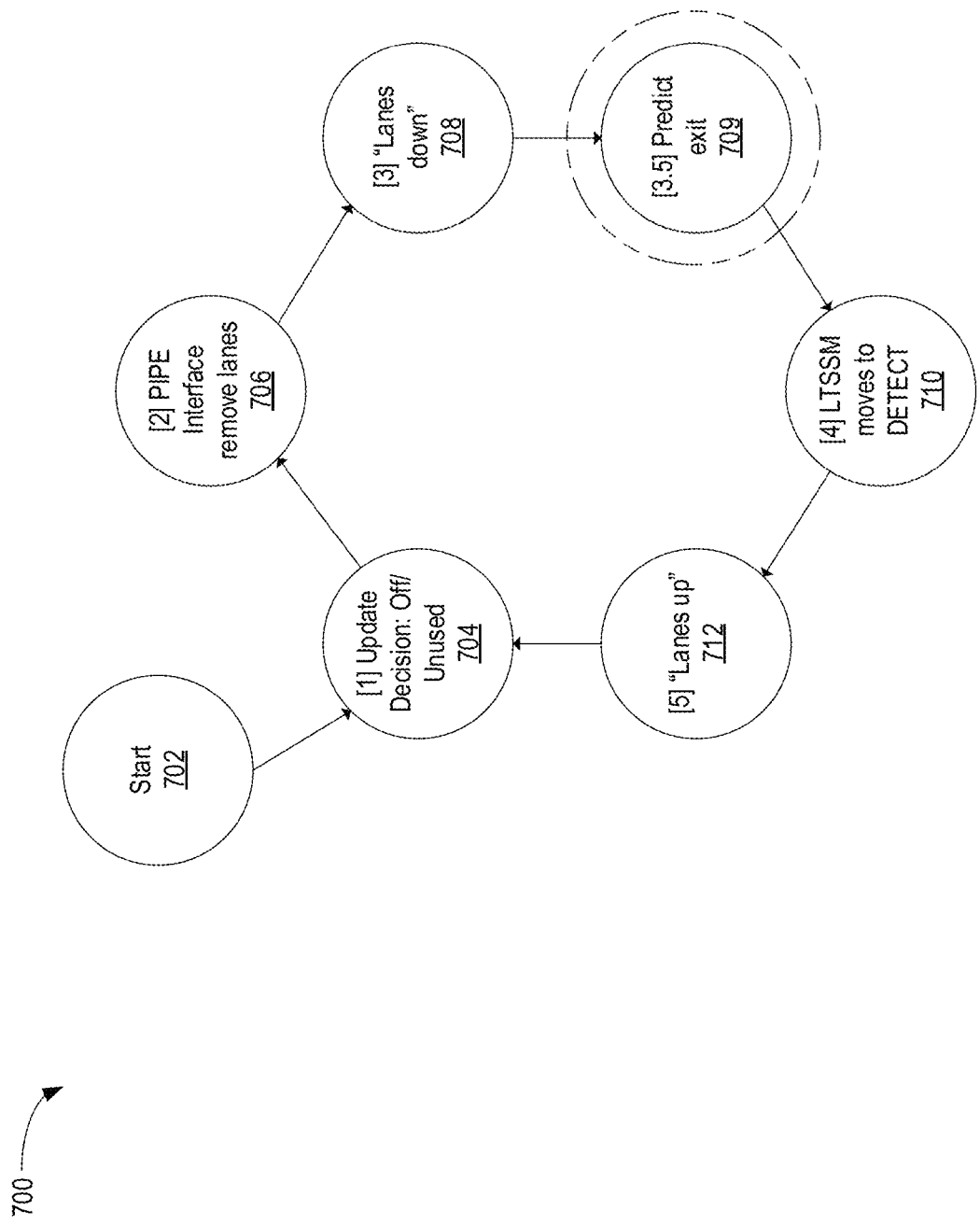
FIG. 7 is a flow chart illustrating a method for unused lanes controller with prediction, according to certain embodiments.

FIG. 7 is a flow chart illustrating a method 700 for unused lanes controller with prediction, according to certain embodiments. The method 700 begins at block 702. At block 704, the ULC begins with evaluating the preferred low power state of the non-active lanes. At block 706, the ULC monitors the PIPE interface to detect when any lane is pushed into a low power state. At block 708, the state is now in low power state. If the preferred low power state for a lane is in unconnected mode, the ULC now uses the side band control signals to put the lane in a low power state. At block 709, the ULC utilizes an external indication to predict the upcoming return to active state. More specifically, based on the prediction, the controller decides whether to put the lanes in unconnected power state or unused power state. In the wake up process, device controller may decide to switch between unconnected power state and unused power state based on a prediction to save the extra latency time. At block 710, the ULC waits for the LTSSM to move into a detect state. At block 712, the new state is now in an active state. If the preferred low power state for this lane is in unconnected power state, the ULC now uses the sideband control signals to wake up the lane from that state, back to a MAC controlled state.

Figure 8:
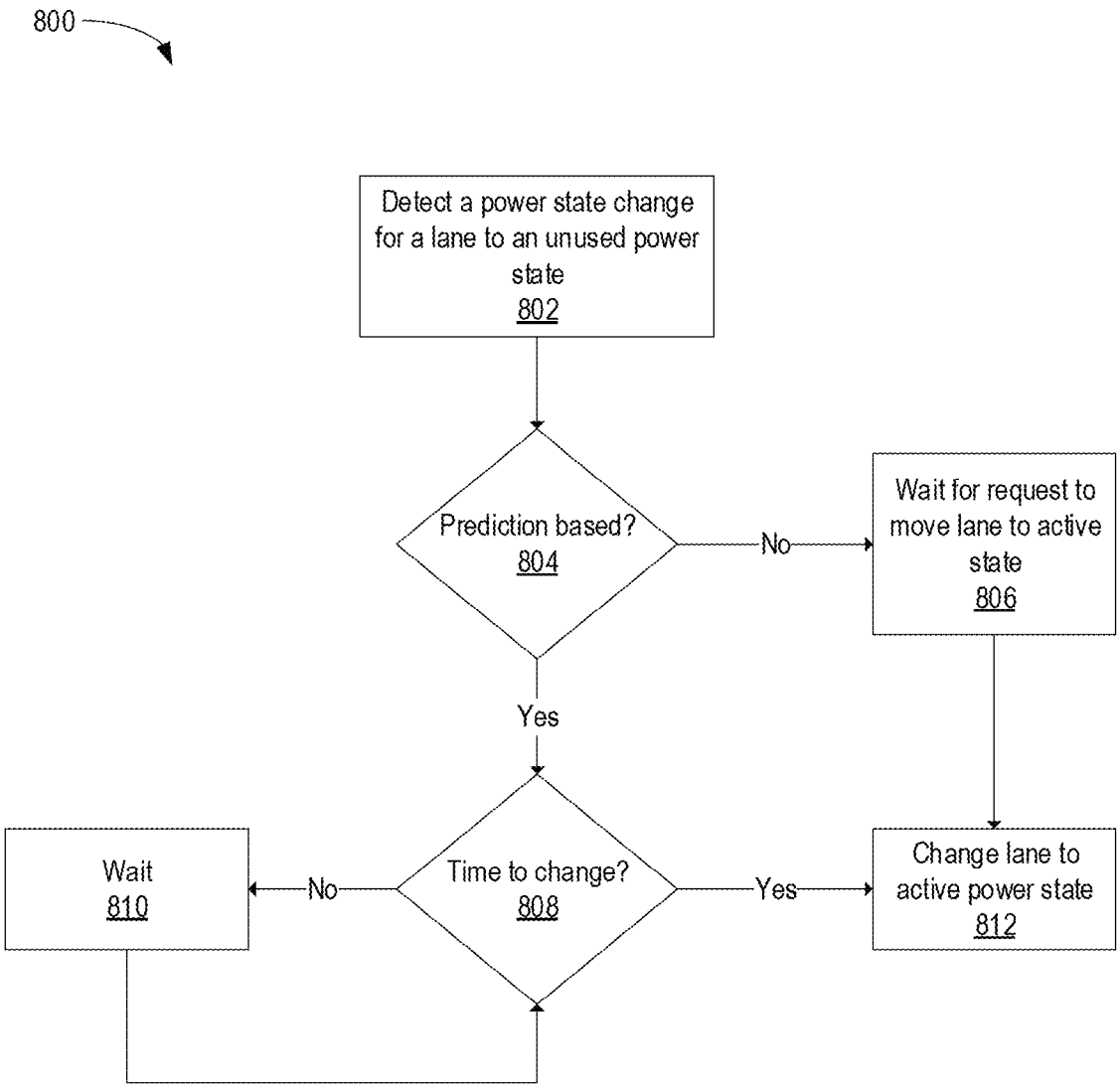
FIG. 8 is a flow chart illustrating a method for power lane power state change, according to certain embodiments.

FIG. 8 is a flow chart illustrating a method 800 for power lane power state change, according to certain embodiments. Method 800 begins at block 802. At block 802, the controller detects a power state change for a lane to an unused power state. At block 804, the controller determines whether the power state change is prediction based. If the controller determines that the power state change is not prediction based, then the method 800 proceeds to block 806. If the controller determines that the power state change is prediction based, then the method 800 proceeds to block 808. At block 806, the controller waits for request to move the lane to an active state and, then the method 800 proceeds to block 812. At block 808, the controller determines whether the time has been reached for the power state to be changed. If the controller determines that the time has not been reach for the power state to be changed, then the method 800 proceeds to block 810. At block 810, the controller will wait and, then the method 800 will return to block 808. If the controller determines that the time has been reached for the power state to be changed, then the method 800 proceeds to block 812. At block 812, the controller will change the lane to an active power state.

Using a ULC allows lanes to decrease exit latency and increase performance of the lanes. A ULC that monitors the LTSSM and the PIPE interface, will allow the SSD to save more power when not all lanes are in an active working state.

In one embodiment, a data storage device comprises: a memory device; and a controller coupled to the memory device, wherein the controller is configured to: determine that one or more lanes of a physical connection (PHY) is unused; change a state of the one or more lanes of the PHY to an unconnected state from an unused state; and change the state of the one or more lanes of the PHY back to the unused state. Further comprising: a MAC; and at least one unactive lanes controller (ULC) coupled between the PHY and MAC. The at least one ULC comprises a plurality of ULCs, wherein the one or more lanes comprises a plurality of lanes. A number of ULCs is equal to one less than a number of lanes of the plurality of lanes. Each ULC is configured to monitor a different link training and status state machine (LTSSM) link. A first ULC of the at least one ULC is configured to cause at least one lane to always work in an unconnected power saving state. A first ULC of the at least one ULC is configured to cause at least one lane to always work in an unused power saving state. The at least one ULC is configured to work dynamically. The at least one ULC is configured to collect information regarding power states of lanes of the PHY. The at least one ULC is configured to receive external decision making information regarding power states of lanes of the PHY.

In another embodiment, a data storage device comprises: a memory device; and a controller coupled to the memory device, wherein the controller includes: a physical connection for connecting a plurality of lanes to a host device; a MAC coupled to the PHY; and at least one unactive lanes controller (ULC) coupled between the PHY and the MAC, wherein the at least one ULC is configured to moved inactive lanes of the plurality of lanes into an unconnected state. The at least one ULC comprises a plurality of ULCs and wherein a number of ULCs is equal to one less than a number of the plurality of lanes. The at least one ULC is configured to detect a power state of the plurality of lanes. The at least one ULC is configured to evaluate a preferred low power state of non-active lanes of the plurality of lanes. The at least one ULC is configured to monitor an interface between the PHY and MAC and detect a power change for the plurality of lanes. The at least one ULC is configured to wakeup a first lane of the plurality of lanes from the unconnected state and place the first lane into a MAC controlled state. The at least one ULC is configured to predict when to change a state of at least one lane of the plurality of lanes.

In another embodiment, a data storage device comprises: means to store data; and a controller coupled to the means to store data, wherein the controller is configured to: monitor power states of one or more lanes connecting a physical connection (PHY) to a host device; detect that one or more lanes is in an unused power state; and change a power state of the one or more lanes in the unused power state to an unconnected power state, wherein the controller is configured to performing the monitoring at a location between the PHY and a MAC. The controller is configured to predict when the one or more lanes is to return to an active power state. The predicting is a time based predicting.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
determine that one or more lanes of a physical connection (PHY) is unused;
change a state of the one or more lanes of the PHY to an unconnected state from an unused state; and
change the state of the one or more lanes of the PHY back to the unused state, wherein the controller comprises a plurality of unactive lanes controllers (ULCs), wherein the one or more lanes comprises a plurality of lanes, and wherein a number of ULCs is equal to one less than a number of lanes of the plurality of lanes.

2. The data storage device of claim 1, further comprising:
a media access layer (MAC), wherein the plurality of the ULCs are coupled between the PHY and the MAC.

3. The data storage device of claim 2, wherein each ULC is configured to monitor a different link training and status state machine (LTSSM) link.

4. The data storage device of claim 2, wherein a first ULC of the plurality of ULCs is configured to cause at least one lane to always work in an unconnected power saving state.

5. The data storage device of claim 2, wherein a first ULC of the plurality of ULCs is configured to cause at least one lane to always work in an unused power saving state.

6. The data storage device of claim 2, wherein the plurality of ULCs are configured to work dynamically.

7. The data storage device of claim 6, wherein the plurality of ULCs are configured to collect information regarding power states of lanes of the PHY.

8. The data storage device of claim 6, wherein the plurality of ULCs are configured to receive external decision making information regarding power states of lanes of the PHY.

9. A data storage device, comprising:
a memory device; and
a controller coupled to the memory device, wherein the controller includes:
a physical connection (PHY) for connecting a plurality of lanes to a host device;
a media access layer (MAC) coupled to the PHY; and
at least one unactive lanes controller (ULC) coupled between the PHY and the MAC, wherein the at least one ULC is configured to move inactive lanes of the plurality of lanes into an unconnected state, wherein the at least one ULC comprises a plurality of ULCs and wherein a number of ULCs is equal to one less than a number of the plurality of lanes.

10. The data storage device of claim 9, wherein the at least one ULC is configured to detect a power state of the plurality of lanes.

11. The data storage device of claim 9, wherein the at least one ULC is configured to evaluate a preferred low power state of non-active lanes of the plurality of lanes based at least in part on a link training and status state machine (LTSSM) link.

12. The data storage device of claim 9, wherein the at least one ULC is configured to monitor an interface between the PHY and MAC and detect a power change for the plurality of lanes.

13. The data storage device of claim 9, wherein the at least one ULC is configured to wakeup a first lane of the plurality of lanes from the unconnected state and place the first lane into a MAC controlled state.

14. The data storage device of claim 9, wherein the at least one ULC is configured to predict when to change a state of at least one lane of the plurality of lanes.

15. A data storage device, comprising:
means to store data; and
a controller coupled to the means to store data, wherein the controller is configured to:
monitor power states of one or more lanes connecting a physical connection (PHY) to a host device;

detect that one or more lanes is in an unused power state; and change a power state of the one or more lanes in the unused power state to an unconnected power state, wherein the controller is configured to perform the monitoring at a location between the PHY and a media access layer (MAC), wherein the controller comprises a plurality of unactive lanes controllers (ULCs), wherein the one or more lanes comprises a plurality of lanes, and wherein a number of ULCs is equal to one less than a number of lanes of the plurality of lanes.

16. The data storage device of claim 15, wherein the controller is configured to predict when the one or more lanes is to return to an active power state.

17. The data storage device of claim 16, wherein the predicting is a time based predicting.

18. The data storage device of claim 15, wherein each ULC is configured to monitor a different link training and status state machine (LTSSM) link.

19. The data storage device of claim 15, wherein a first ULC of the plurality of ULCs is configured to cause at least one lane to always work in an unconnected power saving state.

20. The data storage device of claim 15, wherein a first ULC of the plurality of ULCs is configured to cause at least one lane to always work in an unused power saving state.

* * * * *